Dec. 15, 1925.

A. E. HAMPTON ET AL 1,565,737

CHICK FEEDER

Filed Sept. 18, 1922  2 Sheets-Sheet 1

Witnesses:

Inventor
Abijah E. Hampton
Charles S. Marshall

By Joshua R. H. Potts
His Attorney

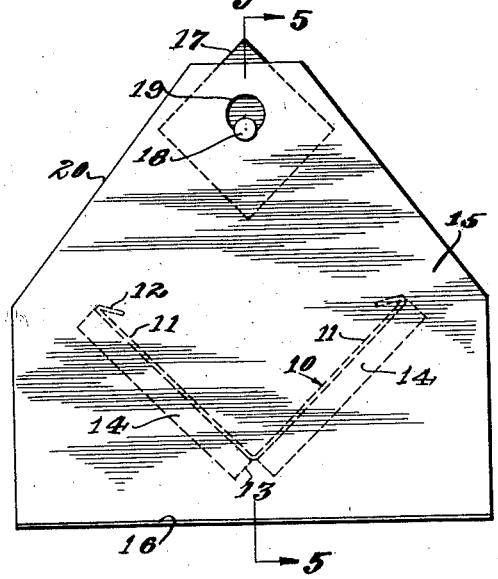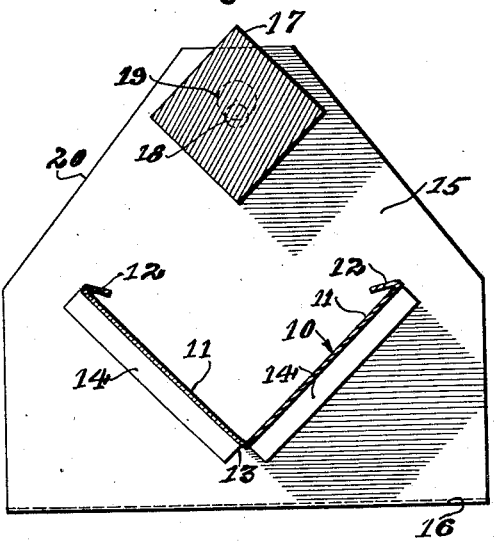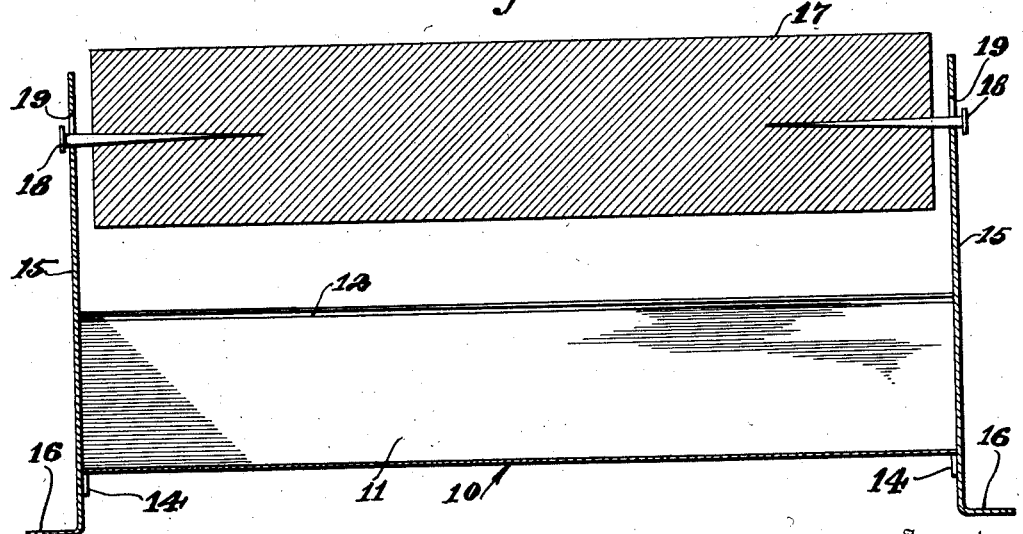

Patented Dec. 15, 1925.

1,565,737

UNITED STATES PATENT OFFICE.

ABIJAH E. HAMPTON, OF PITTSTOWN, AND CHARLES S. MARSHALL, OF BAPTISTOWN, NEW JERSEY.

CHICK FEEDER.

Application filed September 18, 1922. Serial No. 588,757.

*To all whom it may concern:*

Be it known that we, ABIJAH E. HAMPTON and CHARLES S. MARSHALL, citizens of the United States, residing at Pittstown, county of Hunterdon, and State of New Jersey, and Baptistown, county of Hunterdon, and State of New Jersey, have invented certain new and useful Improvements in Chick Feeders, of which the following is a specification.

This invention relates to poultry feeders and more particularly to a trough for feeding chicks or other young fowls.

The object of the invention is to provide a simple and inexpensive device of the above character which is constructed with a view to preventing the chicks from scattering the feed as well as avoiding contamination of the food from actions of the fowl.

This object, and other advantageous ends which will be described hereinafter, we attain in the following manner, reference being had to the accompanying drawings in which—

Figure 3 is an end elevation,

Figure 4 is a vertical sectional view taken on the line 4—4 of Figure 1, and

Figure 5 is a vertical longitudinal sectional view taken on the line 5—5 of Figure 3.

Figure 1:
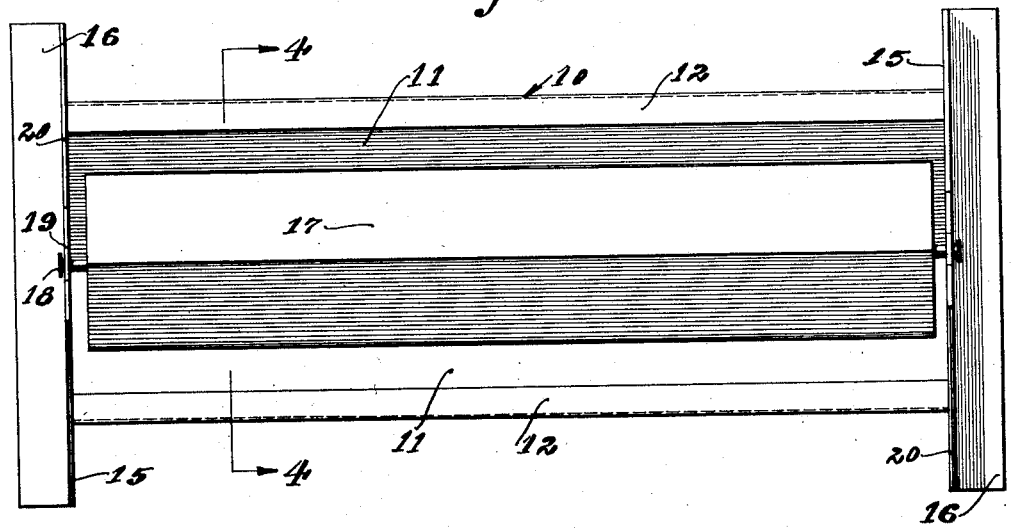
Figure 1 is a top plan view of the improved chick feeder.
Figure 2:
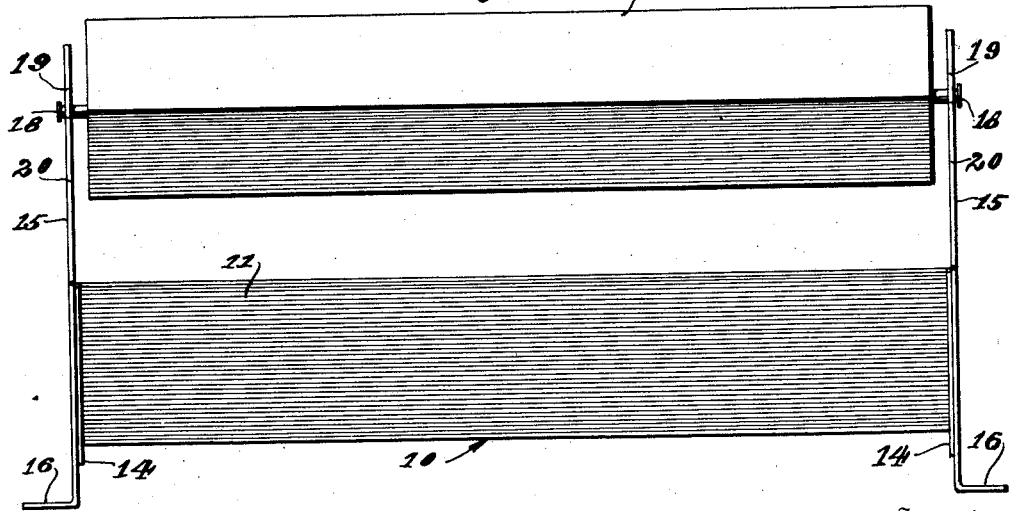
Figure 2 is a side view.

In the drawings, the chick feeder is shown consisting of a trough 10, preferably of galvanized sheet metal, bent to provide oppositely disposed sides 11 disposed in angular relation to each other to leave the trough open at the top. The opposite edges of the sides are turned inwardly and downwardly as shown at 12.

Trough 10 is made up of a plate and has its ends slit longitudinally a short distance as indicated at 13 and the end portions thus produced are angularly bent to form flanges 14. Upright plates 15 are disposed against and close the ends of the trough and flanges 14 are soldered or otherwise secured to the inner faces of the plates. The plates have bottom pads 16 for support and stiffening, and it will be noted that the bottom of the trough is spaced from bottom pads 16.

A perch 17, consisting of a rectangular bar of wood, has headed pins or nails 18 at its ends and is pivotally mounted in upright plates 15. The length of the bar is slightly less than the distance between the plates. Openings 19 slightly larger than the heads of pins 18 are provided in the plates 15 near the upper edges directly over trough 10 to receive pins 18 whereby the bar may be removed when placing feed in the trough. Plates 15 are also preferably provided with oppositely sloping edges 20.

Bar 17 is preferably so balanced and mounted that one of its corners is disposed upward and its sides slope downward over sides 11 of trough 10. When a chick attempts to hop into the trough or upon the perch or bar 17 and lands thereon, it will be thrown backward away from the trough or on the opposite side, due to the turning of the bar, thus preventing the chicks from jumping into the feed and avoiding contamination thereof and dangers incident thereto. Flanges 12 serve to catch the surplus feed held between the bills of the fowl and thus prevent scattering of the feed. All of the parts are preferably of sheet material, such as galvanized sheet iron, and while I have described the bar as being of wood, it may be of any other suitable material, and it may be mounted on or off-center. The latter would normally cause unbalancing to precipitate a fowl.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A chick feeder comprising a trough; plates secured to the ends of the trough; an angular bar of less length than the distance between and extending above the plates, and pivot pins extending from the ends of the bar, supported by the plates and held against transverse movement relative thereto but freely movable upwardly therefrom.

2. A chick feeder comprising a trough; plates secured to the ends of the trough and provided with openings near their upper edges; a bar, and headed pins in the ends of the bar and passing through the openings, the heads of the pins being of smaller dimension than the openings whereby the bar may be removed from the plates.

3. A chick feeder comprising a trough; plates secured to the ends of the trough and having parts provided with openings extending above the trough; a rectangular bar, and headed pins in the ends of the bar passing through the openings, the bar being of less length than the distance between the plates and the heads of the pins of less dimension than the openings whereby the bar may be removed from the plates.

In testimony whereof we have signed our names to this specification.

ABIJAH E. HAMPTON.
CHARLES S. MARSHALL.